(12) United States Patent
Cellier

(10) Patent No.: US 8,045,822 B2
(45) Date of Patent: Oct. 25, 2011

(54) CORRECTION OF IMAGE DISTORTION

(75) Inventor: Alexandre Cellier, Le Versoud (FR)

(73) Assignee: STMicroelectronics SA, Montrouge (FR)

( * ) Notice: Subject to any disclaimer, the term of this patent is extended or adjusted under 35 U.S.C. 154(b) by 652 days.

(21) Appl. No.: 12/205,665

(22) Filed: Sep. 5, 2008

(65) Prior Publication Data

US 2009/0067745 A1  Mar. 12, 2009

(30) Foreign Application Priority Data

Sep. 7, 2007 (FR) ...................................... 07 06273

(51) Int. Cl.
*G06K 9/40* (2006.01)
(52) U.S. Cl. ...................................................... 382/275
(58) Field of Classification Search .......... 382/254–275; 348/E5.078
See application file for complete search history.

(56) References Cited

U.S. PATENT DOCUMENTS

| 6,002,454 A | 12/1999 | Kajiwara et al. |
| 2002/0164083 A1* | 11/2002 | Song et al. ............ 382/275 |
| 2006/0188172 A1 | 8/2006 | Higurashi et al. |

* cited by examiner

*Primary Examiner* — Phuoc Tran
*Assistant Examiner* — Alex Liew
(74) *Attorney, Agent, or Firm* — Lisa K. Jorgenson; Hayley J. Stevens; Seed IP Law Group PLLC

(57) ABSTRACT

An image sensor captures an image of a scene. This captured image has a pincushion distortion relative to an undistorted image of the scene. The distortion is corrected based on an approximation of the distortion D which satisfies the following equation for a given pixel in the captured image: $D=(R-R')/R=Da*(y^2-x^2+y_{offset})+Db*R^4$, where R is the distance between a pixel, which corresponds in the undistorted image to the given pixel in the captured image, and the center of the undistorted image, R' is the distance between the given pixel and the center of the captured image, Da and Db are respective distortion parameters of the image sensor, x and y are coordinates of the given pixel in the captured image, R satisfies the following equation: $R^2=x^2+y^2$ and $y_{offset}$ corresponds to a constant value.

8 Claims, 4 Drawing Sheets

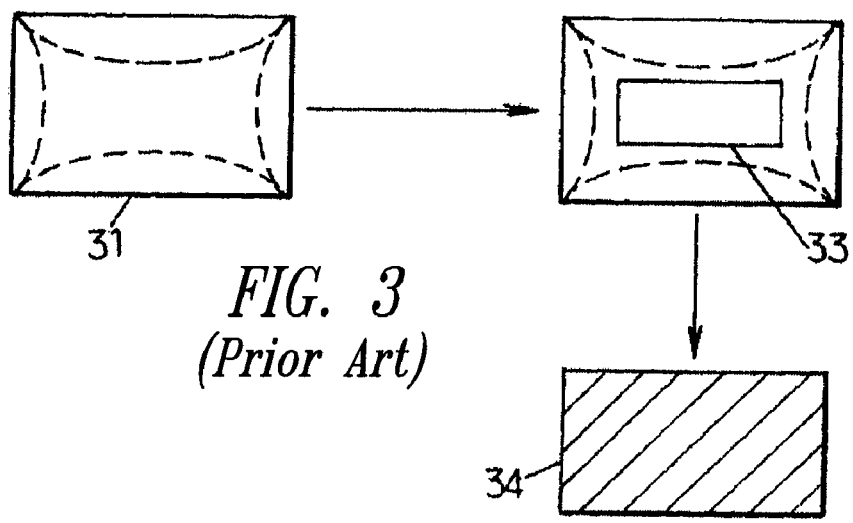
FIG. 3
(Prior Art)
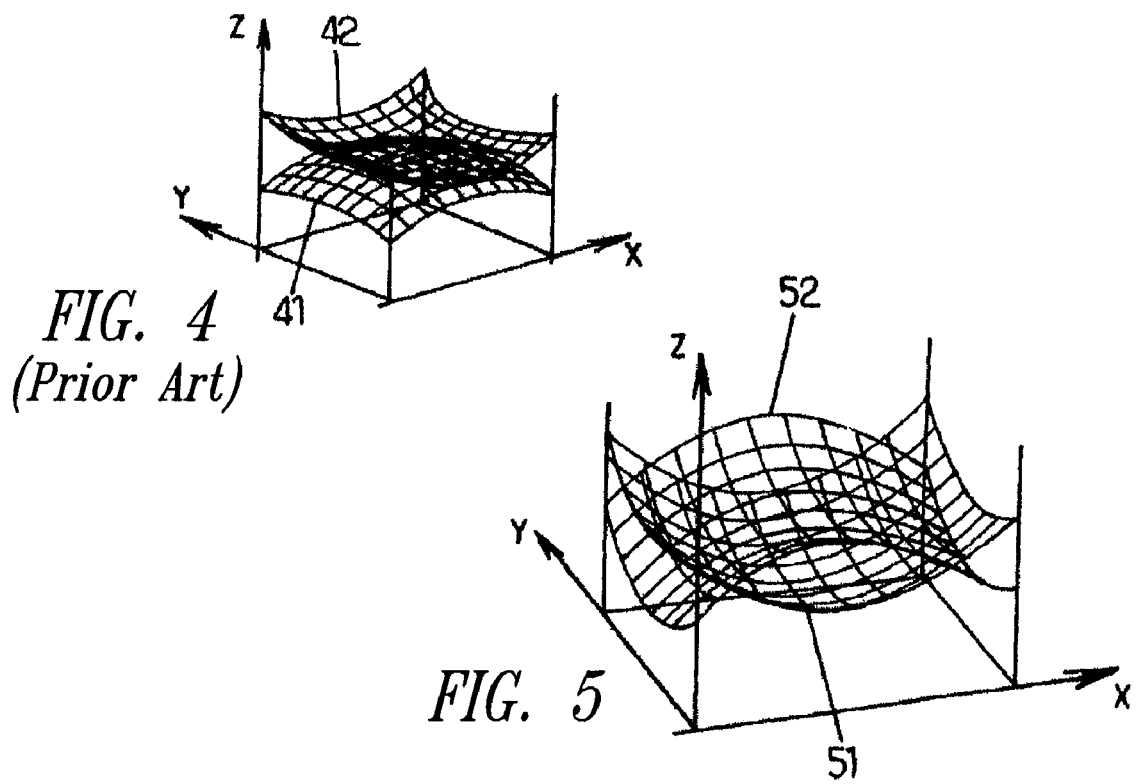
FIG. 4
(Prior Art)
FIG. 5

CORRECTION OF IMAGE DISTORTION

REFERENCE TO RELATED APPLICATION

This application claims the benefit under 35 U.S.C. §119 (a) of French Patent Application No. 07 06273 filed Sep. 7, 2007, which application is incorporated herein by reference in its entirety.

BACKGROUND

1. Technical Field

This invention relates to the field of image sensors, more specifically the image sensors which introduce geometric distortions into captured images.

2. Description of the Related Art

Such image sensors have lenses for focusing the captured images of a scene. The presence of these lenses can be a source of distortions in the captured images relative to the scene itself.

Thus a wide-angle lens introduces pincushion distortions as illustrated in FIG. 1, while a lens with a small angle, or zoom lens, introduces barrel distortions as illustrated in FIG. 2.

In FIG. 1, an image 11 corresponds to an image of the scene to be captured and an image 12 corresponds to an image captured from the scene by an image sensor which introduces a pincushion distortion. In an XY image coordinate system, the image 12 has lines which bulge toward the center of the image on the X and Y axes.

No distortion affects the image 11 which corresponds to the image of the original scene, and a distance R separates the optical center 101 or center of the image from a given pixel 102.

However, in the captured image 12 of this scene affected by a distortion, a distance R', which can vary relative to the distance R as a function of the pixels concerned, separates the center of the image or optical center 103 from a given pixel 104.

Similarly, in FIG. 2, an image 21 corresponds to an image of the scene to be captured and an image 22 corresponds to an image captured from the scene by an image sensor which introduces a barrel distortion. In an XY image coordinate system, the image 22 has lines which bulge toward the outside of the image on the X and Y axes.

No distortion affects the image 21 which corresponds to the image of the original scene. As was described with reference to FIG. 1, a distance R separates the optical center or center of the image from a given pixel in the undistorted image 21.

However, in the captured image 22 of this scene affected by a distortion, a distance R', which can vary relative to the distance R as a function of the pixels concerned, separates the center of the image or optical center from a given pixel in the captured and therefore distorted image.

In these two types of distortions, note that the distortions introduced into the lines of pixels on the X and Y axes are greater at the edges than at the center of the captured image.

To correct these geometric distortions of the image, a distortion correction algorithm can be implemented in the sensors. Such a correction algorithm is conventionally based on an approximation of the distortion, for a given pixel in the captured image, which can be expressed in the form of the following equation:

$$D=(R-R')/R=Da*(y^2-x^2+y_{offset})+Db*R^4 \quad (1)$$

where D represents the distortion as a percentage,

R is the distance between the center of the image, or optical center, and the current given pixel in the undistorted image, R' is the distance between the center of the image and the current given pixel in the distorted image, Da and Db are distortion parameters, x is a coordinate for the horizontal position of the current given pixel and y is a coordinate for the vertical position of the current given pixel, and R satisfies the following equation:

$$R^2=x^2+y^2$$

The distortion thus modeled as a parabola equation has no effect on the image when the distortion parameters Da and Db are zero.

However, when these two distortion parameters both have negative values a barrel distortion affects the captured image, and when these two distortion parameters both have positive values the captured image is affected with a pincushion distortion.

When these two distortion parameters have values with different signs, the distortion profile varies between the two types of distortions.

These two distortion parameters are therefore parameters that characterize the lens used in the image sensor in question.

The distortion affecting the captured image is a geometric aberration which is due to the lenses. It is characterized by a curve in a source plane which increases with the distance from the optical center.

In this context, the correction of the distortion affecting the captured image aims to correct the distortions due to the lens by determining the distance between the center of the image and each pixel in the original undistorted image of the scene, in order to apply it to a distorted captured image. Thus one can reestablish distances between the pixels in the captured image which are substantially equal to the distances between these same pixels in the undistorted image of the scene.

During such a correction of barrel-type geometric distortions, the captured and distorted image is enlarged due to this correction. Certain pixels of this corrected image are then ignored in order to end with a corrected image that is the same size as the initial captured image. The captured image processed in this manner does not undergo a specific enlargement step, as it is the correction itself which results in the enlargement of the captured image.

Conversely, during a correction of pincushion-type geometric distortions, the captured image, corrected using a correction of the same type as described above, is reduced in size relative to the size of the initial captured image. As a result, it is necessary to add a step of enlarging the corrected captured image such that the final image is once again the size of the initially captured image.

FIG. 3 illustrates the application of the above steps to correct an image which has a pincushion distortion.

A captured image 31 has pincushion distortions. To correct these distortions, all pixels of the image are used. A corrected image 33 is thus obtained which is smaller in size than the captured image 31. Next this smaller corrected image 33 is enlarged so that it corresponds to the size of the captured image.

In such a correction, the captured image undergoes two processing steps, one the correction of the pincushion distortion which corresponds to obtaining the corrected captured image 33 from the captured image 31, and an enlargement of the image which corresponds to obtaining the final image 34 in which the distortions have been corrected from the captured corrected image 33, where the image 34 is of the same size as the captured image 31.

These two successive processing steps result in a degradation in the quality of the final image 34 obtained, because such an image 34 undergoes a loss of resolution in each of these two processing steps. The second step, the enlargement step, which is a supplemental step in addition to the correction applied to images which have a barrel-type geometric distortion, results in a loss of image resolution.

BRIEF SUMMARY

One embodiment improves such processing of a captured image.

One embodiment is a process for processing an image captured from a scene by an image sensor, with said image presenting a pincushion distortion relative to an undistorted image of said scene, wherein said distortion is corrected in the captured image on the basis of an approximation of the pincushion distortion which satisfies the following equation for a given pixel in the captured image:

$$D=(R-R')/R=Da*(y^2-x^2+y_{offset})+Db*R^4$$

where D represents the approximation of said distortion as a percentage,

R is the distance between a pixel, which corresponds in an undistorted image of the scene to the given pixel in the captured image, and the center of the undistorted image of the scene, R' is the distance between the given pixel of the captured image and the center of the captured image, Da and Db are respective distortion parameters of the image sensor, x and y are coordinates of the given pixel in an image coordinate system for the captured image, R satisfies the following equation:

$$R^2=x^2+y^2$$

and $y_{offset}$ corresponds to a constant value for each line of pixels in the image.

Through these measures, a pincushion distortion can perhaps be corrected on the basis of an approximation which allows not reducing the size of the captured image. Thus the enlargement step to increase the size of the corrected captured image is not required, as it is in the prior art.

Therefore the processing applied to the captured image affected by pincushion-type geometric distortions corrects the distortions without requiring the enlargement step of the prior art.

One can, in fact, replace the image reduction resulting from applying the correction of the pincushion distortions and the enlargement of the corrected image, with a single correction step, which allows increasing the quality of the image obtained after the processing to correct pincushion distortions.

More specifically, on the basis of such an approximation, a profile is obtained for the pincushion image distortion along one of the axes of the image coordinate system, the X or Y axis, which is similar to the one obtained in the prior art modeling of barrel distortions. Thus, under similar conditions, the image enlargement step described above can be avoided.

In one embodiment of the invention, the constant $y_{offset}$ satisfies the following equation:

$$y_{offset}=(I_{size})^2$$

where $I_{size}$ corresponds to the width of the captured image.

A second embodiment proposes an image processing device which is adapted to implement an image processing process according to an embodiment of the invention.

A third embodiment proposes a digital photography device comprising a processing device according to the second embodiment.

A fourth embodiment proposes a digital camera comprising a processing device according to the second embodiment.

A fifth embodiment proposes a computer-readable medium having contents that cause a computing device to perform the process according to the first embodiment.

Other features and advantages will become clear upon reading the following description.

BRIEF DESCRIPTION OF THE SEVERAL VIEWS OF THE DRAWING(S)

The invention will also be better understood through the drawings, in which.

Figure 6:
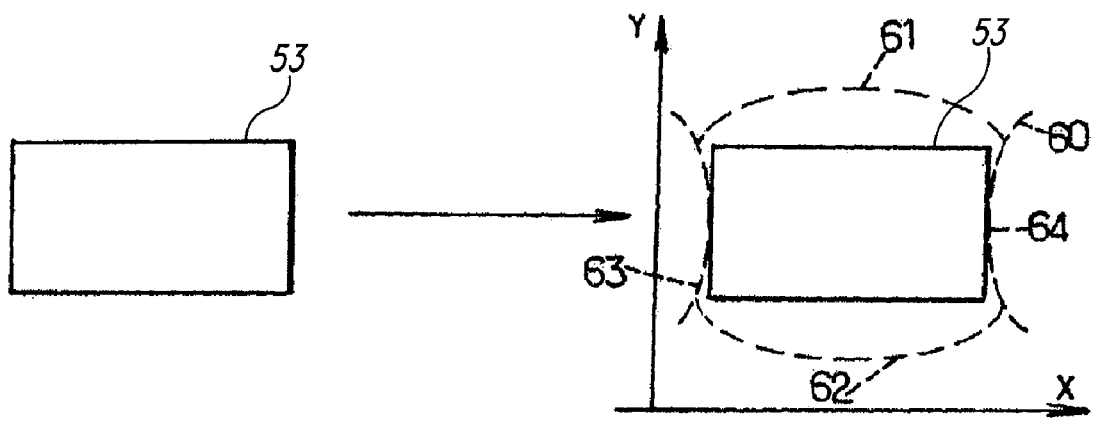
Figure 7:
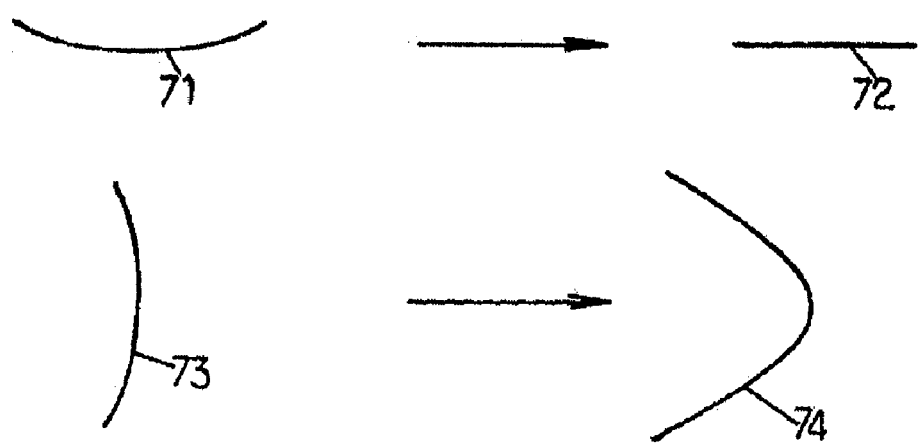
Figure 8:
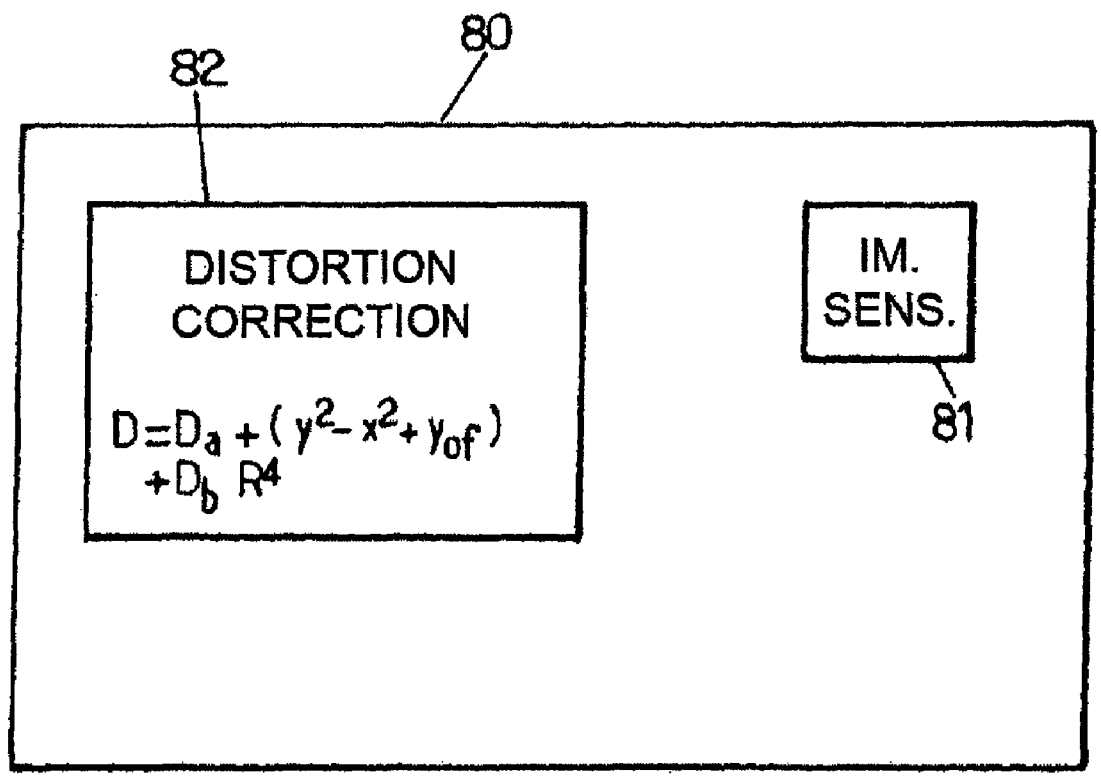

FIG. 3 illustrates different steps in the prior art processing applied to an image that has pincushion-type geometric distortions, FIG. 4 illustrates prior art representations of two types of three-dimensional distortions, FIG. 5 illustrates a representation of three-dimensional pincushion distortions in an embodiment, FIG. 6 is a representation of planar distortions of a captured image in an embodiment, FIG. 7 illustrates another representation for modeling planar image distortions in an embodiment, and FIG. 8 illustrates an image processing device in an embodiment.

DETAILED DESCRIPTION

FIG. 4 illustrates prior art representations of two types of three-dimensional distortions.

More specifically, on the basis of the previously described equation (1), one can produce curves corresponding to three-dimensional representations of pincushion and barrel distortions in a three-dimensional coordinate system XYZ, such that a projection of a curve onto the XY plane corresponds to the distorted captured image.

A first curve 41 represents a three-dimensional modeling of a barrel distortion and a second curve 42 represents a three-dimensional modeling of a pincushion distortion.

One can see that when a correction of a pincushion distortion is applied on the basis of such a distortion modeling satisfying the equation (1), an image enlargement step is introduced which degrades the image quality, which is not the case when correcting a barrel distortion on the basis of this same modeling.

In one embodiment, the pincushion distortion of the image along the horizontal X axis is corrected. For this purpose, an image profile for the pincushion distortion is searched for along the horizontal X axis which is similar to the one obtained in the barrel distortion modeling, in order to avoid the subsequent image enlargement of the distortion correction step as described above. In this manner the degradation in the corrected image can be avoided.

For this purpose, it is proposed to modify the approximation of the distortions in equation (1), by expressing it according to the following equation:

$$D=(R-R')/R=Da*(y^2-x^2+y_{offset})+Db*R^4 \quad (2)$$

where $y_{offset}$ corresponds to a constant value for each line of pixels in the image.

This value can be determined as a function of the size of the image in question.

In one embodiment, the $y_{offset}$ is computed as follows:

$$y_{offset}=(I_{size})^2$$

where $I_{size}$ corresponds to the width of the captured image.

The term 'image of the scene' is understood to mean an image which reproduces without distortions the scene to be captured, and which has dimensions corresponding to those of an image captured by the image sensor concerned.

Such an equation (2) corresponds to a hyperbola formula.

FIG. 5 illustrates a three-dimensional representation of the modeling of pincushion distortion in an embodiment and a three-dimensional representation of the same modeling in the prior art in the same three-dimensional coordinate system XYZ.

Thus a curve 51 corresponds to the three-dimensional representation of the modeling of a pincushion image distortion in the prior art and a curve 52 corresponds to the representation of the modeling of a pincushion image distortion in an embodiment. The curve 51 is produced on the basis of the equation (1) and the curve 52 is produced on the basis of the equation (2).

Proceeding in this manner, the curve 52, which is a modeling of the pincushion distortion in an embodiment, advantageously has a profile on the X axis which resembles that of the curve 41 in FIG. 4 which is a prior art modeling of barrel distortion.

FIG. 6 illustrates a projection of the curve 52 onto the XY image coordinate system as defined above, resulting in a captured image 60 compared to an undistorted image 53 of the same scene.

By performing such a projection of the curve 52, which represents the modeling of the pincushion distortion in an embodiment, the distortion profile for the captured image 60 according to an embodiment is obtained.

Note here that unlike the captured image 12 represented on the basis of a prior art distortion modeling, the profile of the lines of the image 60 on the X axis, particularly the lines 61 and 62, advantageously bulge outwards towards the exterior of the image.

Figure 2:
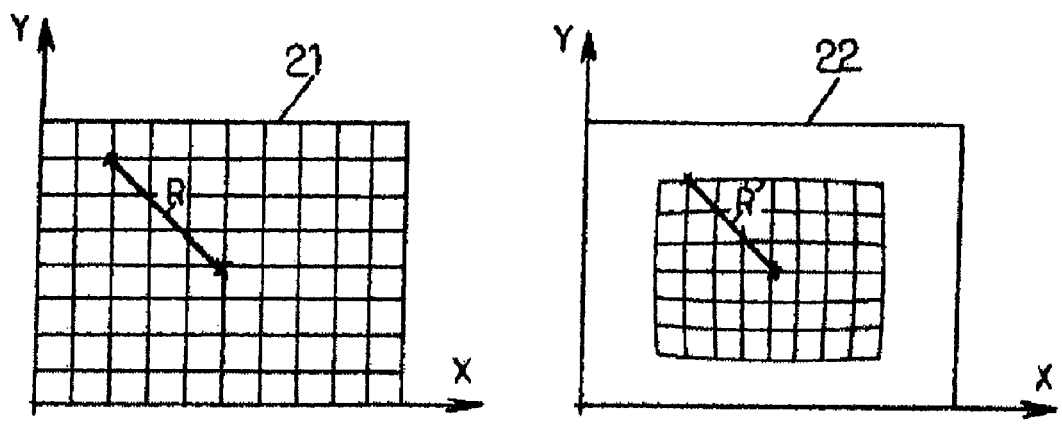
FIG. 2 illustrates barrel-type geometric distortions in a captured image.

In fact, the profile of these lines on the X axis in the captured image 60 is similar to that of the lines on both the X axis and the Y axis of the image 22 illustrated in FIG. 2 concerning barrel distortions.

Figure 1:
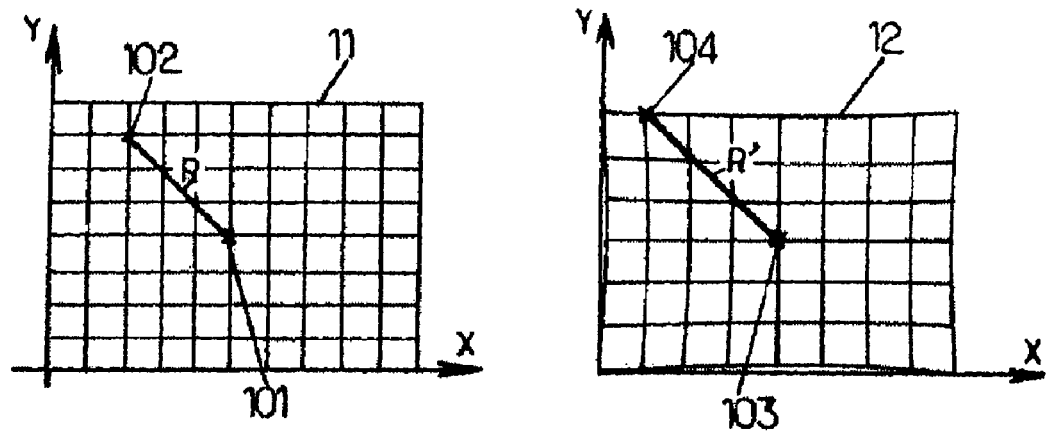
FIG. 1 illustrates pincushion-type geometric distortions in a captured image.

Therefore there is a clear inversion of the profile for the lines on the X axis for the captured image 60 in which the pincushion distortion is modeled in an embodiment, relative to the profile for the lines on the X axis of the image 12 in which the pincushion distortion is modeled by the prior art, as illustrated in FIG. 1.

Through such an inversion of the profile for the line distortion on the X axis, the correction of the pincushion distortion can be performed under the same conditions as the correction of the barrel distortion as described in the prior art. Thus, during such a correction, the captured image does not undergo a size reduction along the X axis. Therefore no enlargement step is then applied to the image. In this manner, it is possible to obtain corrected captured images which have an image quality superior to that of captured images corrected on the basis of a three-dimensional representation of the distortion satisfying the prior art equation (1).

Because of this characteristic, it is possible to correct pincushion image distortions without degrading the quality of the corrected image along the X axis because, as is the case when correcting a barrel image distortion, it is no longer necessary to apply an enlargement step to the image obtained after the correction.

In one embodiment, the distortion correction is performed only along the X axis. FIG. 6 illustrates the lines of pixels 63 and 64 in the image 60 on the Y axis, which still bulge inward towards the center of the image 60, meaning they have a profile similar to that of a captured image modeled according to the prior art.

Note that on the basis of a distortion representation or modeling in an embodiment, the distortions in the parts of the image in proximity to the image edges on the X axis are corrected effectively, while a slight accentuation of the distortions may appear in the parts of the image nearing the outside edges on the Y axis.

FIG. 7 illustrates such an effect. A curved line 71 on the X axis in the captured image is substantially a straight line on the X axis in the captured image corrected on the basis of a distortion representation in an embodiment.

But a curved line 73 on the Y axis in the captured image can correspond to a line 74 which is even more curved on the Y axis, meaning the curvature here is accentuated along this axis in the captured image corrected according to an embodiment.

No limitation is placed on the type of pincushion distortion correction which can be implemented on the basis of a distortion modeling.

In fact, any type of image distortion correction which is based on a distortion modeling can easily be implemented on the basis of a pincushion distortion representation according to an embodiment.

In particular, a distortion correction method such as the one described in document U.S. Pat. No. 6,002,454 can be implemented in one embodiment.

FIG. 8 illustrates an image processing device according to an embodiment.

Such an image processing device 80 comprises an image sensor 81 providing a captured image of a scene, where the image has a pincushion distortion relative to said scene.

In addition it comprises an image distortion correction unit adapted to perform a pincushion distortion correction for an image captured by said image sensor, with the correction performed on the basis of an approximation of the pincushion distortion which satisfies the following equation for a given pixel in the captured image:

$$D=(R-R')/R=Da*(y^2-x^2+y_{offset})+Db*R^4$$

where D represents the approximation of said distortion as a percentage,

R is the distance between a pixel, which corresponds in an undistorted image of the scene to the given pixel in the captured image, and the center of the undistorted image of the scene, R' is the distance between the given pixel of the captured image and the center of the captured image, Da and Db are respective distortion parameters of the image sensor, x and y are coordinates of the given pixel in an image coordinate system for the captured image, R satisfies the following equation:

$$R^2 = x^2 + y^2$$

and $y_{offset}$ corresponds to a constant value for each line of pixels in the image.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic process, comprising:
   capturing an image of a scene using an image sensor, said captured image presenting a pincushion distortion relative to an undistorted image of said scene; and
   processing the captured image, the processing including correcting said distortion in the captured image based on an approximation of the pincushion distortion which satisfies the following equation for a given pixel in the captured image:

$$D = (R-R')/R = Da*(y^2 - x^2 + y_{offset}) + Db*R^4$$

where D represents the approximation of said distortion,
   R is the distance between a pixel, which corresponds in the undistorted image of the scene to the given pixel in the captured image, and the center of the undistorted image of the scene,
   R' is the distance between the given pixel of the captured image and the center of the captured image,
   Da and Db are respective distortion parameters of the image sensor,
   x and y are coordinates of the given pixel in an image coordinate system for the captured image,
   R satisfies the following equation:

$$R^2 = x^2 + y^2$$

and $y_{offset}$ corresponds to a constant value for each line of pixels in the image.

2. A process according to claim 1, wherein the constant $y_{offset}$ satisfies the following equation:

$$y_{offset} = (I_{size})^2$$

where $I_{size}$ corresponds to a width of the captured image.

3. An image processing device comprising:
   an image sensor which furnishes a captured image of a scene having a pincushion distortion relative to said scene; and
   an image distortion correction unit structured to perform a correction of a pincushion distortion in an image captured by said image sensor,
   wherein said correction is performed based on an approximation of the pincushion distortion which satisfies the following equation for a given pixel in the captured image:

$$D = (R-R')/R = Da*(y^2 - x^2 + y_{offset}) + Db*R^4$$

where D represents the approximation of said distortion,
   R is the distance between a pixel, which corresponds in the undistorted image of the scene to the given pixel in the captured image, and the center of the undistorted image of the scene,
   R' is the distance between the given pixel of the captured image and the center of the captured image,
   Da and Db are respective distortion parameters of the image sensor,
   x and y are coordinates of the given pixel in an image coordinate system for the captured image,
   R satisfies the following equation:

$$R^2 = x^2 + y^2$$

and $y_{offset}$ corresponds to a constant value for each line of pixels in the image.

4. An image processing device according to claim 3, wherein the constant $y_{offset}$ satisfies the following equation:

$$y_{offset} = (I_{size})^2$$

where $I_{size}$ corresponds to a width of the captured image.

5. A digital photography device, comprising:
   a processing device that includes:
      an image sensor which furnishes a captured image of a scene having a pincushion distortion relative to said scene; and
      an image distortion correction unit structured to perform a correction of a pincushion distortion in an image captured by said image sensor,
      wherein said correction is performed based on an approximation of the pincushion distortion which satisfies the following equation for a given pixel in the captured image:

$$D = (R-R')/R = Da*(y^2 - x^2 + y_{offset}) + Db*R^4$$

where D represents the approximation of said distortion,
      R is the distance between a pixel, which corresponds in the undistorted image of the scene to the given pixel in the captured image, and the center of the undistorted image of the scene,
      R' is the distance between the given pixel of the captured image and the center of the captured image,
      Da and Db are respective distortion parameters of the image sensor,
      x and y are coordinates of the given pixel in an image coordinate system for the captured image,
      R satisfies the following equation:

$$R^2 = x^2 + y^2$$

and $y_{offset}$ corresponds to a constant value for each line of pixels in the image.

6. A digital photography device according to claim 5, wherein the constant $y_{offset}$ satisfies the following equation:

$$y_{offset} = (I_{size})^2$$

where $I_{size}$ corresponds to a width of the captured image.

7. A non-transitory computer-readable medium having contents that cause a computing device to perform a process, comprising:
   capturing an image of a scene using an image sensor, said captured image presenting a pincushion distortion relative to an undistorted image of said scene; and processing the captured image, the processing including correcting said distortion in the captured image based on an approximation of the pincushion distortion which satisfies the following equation for a given pixel in the captured image:

$$D=(R-R')/R=Da*(y^2-x^2+y_{offset})+Db*R^4$$

where D represents the approximation of said distortion,
R is the distance between a pixel, which corresponds in the undistorted image of the scene to the given pixel in the captured image, and the center of the undistorted image of the scene,
R' is the distance between the given pixel of the captured image and the center of the captured image,
Da and Db are respective distortion parameters of the image sensor,
x and y are coordinates of the given pixel in an image coordinate system for the captured image,
R satisfies the following equation:

$$R^2=x^2+y^2$$

and $y_{offset}$ corresponds to a constant value for each line of pixels in the image.

8. A computer-readable medium according to claim 7, wherein the constant $y_{offset}$ satisfies the following equation:

$$y_{offset}=(I_{size})^2$$

where $I_{size}$ corresponds to a width of the captured image.

* * * * *